(12) United States Patent
Cho

(10) Patent No.: US 7,621,305 B2
(45) Date of Patent: Nov. 24, 2009

(54) FOLDABLE GROCERY BAG ORGANIZER

(75) Inventor: Bryan H. Cho, Ann Arbor, MI (US)

(73) Assignee: Fisher Circle, Inc., Livonia, MI (US)

( * ) Notice: Subject to any disclaimer, the term of this patent is extended or adjusted under 35 U.S.C. 154(b) by 569 days.

(21) Appl. No.: 11/195,516

(22) Filed: Aug. 2, 2005

(65) Prior Publication Data

US 2006/0021685 A1 Feb. 2, 2006

Related U.S. Application Data

(60) Provisional application No. 60/598,309, filed on Aug. 2, 2004.

(51) Int. Cl.
*A45C 1/02* (2006.01)

(52) U.S. Cl. .................. 150/113; 150/107; 150/127; 150/129; 150/112; 383/4; 383/119; 383/124; 383/38; 190/107

(58) Field of Classification Search ............... 150/112, 150/127, 129, 113; 383/38, 4, 42, 119, 123, 383/124; 190/107
See application file for complete search history.

(56) References Cited

U.S. PATENT DOCUMENTS

| 2,018,809 | A | * | 10/1935 | Rodgers ............... 190/103 |
| 4,438,844 | A | * | 3/1984 | Kesselman et al. ....... 206/287.1 |
| 5,472,279 | A | * | 12/1995 | Lin ...................... 383/2 |
| 5,573,114 | A | * | 11/1996 | Cyr ..................... 206/316.1 |
| D456,991 | S | * | 5/2002 | Achache ................. D3/233 |
| D491,352 | S | * | 6/2004 | Peng ................... D3/233 |

* cited by examiner

*Primary Examiner*—Tri M Mai
(74) *Attorney, Agent, or Firm*—George L. Boller

(57) ABSTRACT

A collapsible and erectable organizer for holding bags and their contents, such as bags containing grocery items, upright during transport, such as in the trunk of a car. The organizer has Velcro® pieces on its bottom that resist slipping on a carpeted surface and that secure opposite halves of the bottom when the bottom is folded in half to collapse the organizer. The organizer can be used when collapsed to carry smaller items.

2 Claims, 3 Drawing Sheets

FOLDABLE GROCERY BAG ORGANIZER

REFERENCE TO RELATED APPLICATION AND PRIORITY CLAIM

This application claims the priority of Provisional Application No. 60/598,309, filed 2 Aug. 2004.

FIELD OF THE INVENTION

This invention relates generally to organizers. More particularly, it relates to organizers for holding collapsible bags and their contents, such as bags containing grocery items, upright during transport, such as in the trunk of a car.

BACKGROUND AND SUMMARY OF THE INVENTION

When a grocery bag that contains grocery items is placed upright in the trunk of a car for transport, it is inherently prone to tipping over and spilling its contents as the car accelerates, stops, and turns. Hence, a person may take measures that are appropriate to guard against that possibility. A filled bag may be buttressed by tightly packing it in the trunk, using other filled bags and/or other available objects. Filled bags may also be placed in cardboard boxes. Netting is also a means for confining bags in a car or van.

The present invention relates to a new and unique organizer that is useful in holding filled bags upright, yet can be collapsed substantially flat when not in use. By being collapsible to a flat condition, the organizer, unlike a cardboard box, can be kept in a vehicle without taking up a large volume of space. Yet when needed to hold a bag or bags upright, it can be conveniently erected, and the bag or bags easily placed inside it.

When collapsed to substantially flat condition, the organizer can still be used to carry certain articles, especially, but not exclusively, flat sheet materials like papers and notebooks.

One aspect of the invention relates to a collapsible and erectable organizer comprising several fabric panels stitched together to form a bottom and four sides surrounding an open interior space that, when the organizer is erected and stood upright on an underlying support, comprises an open top that allows articles to be set into the interior space.

The bottom comprises a fabric panel that is divided into two equal rectangular halves by a line of stitching that provides a line of folding allowing the two halves to fold along the line of stitching. When the organizer is fully opened and erected, and the bottom is placed on an underlying surface like the floor of a car trunk, the two bottom halves lie side-by-side and generally flat. The four sides are generally upright with the top open. This enables the user to place into the organizer articles that would otherwise be inclined to tip and spill their contents (potted plants, prepared foods, beverages, grocery bags, etc.).

The sides of the organizer are also fabric panels that are stitched together along adjoining edges and also stitched to the edges of the bottom panel. Carrying handles are attached to two opposite sides that are stiffened by inserts between their fabric and a fabric liner on the inside of the fabric. The other pair of sides are fabric that, although also lined on the inside, lack such stiffeners, thereby allowing them to collapse. Attachments are provided at the midpoints of the top edges of that other pair of sides allowing them to be fastened together at those locations when they are collapsed. The two stiffened sides containing the handles remain essentially rectangular.

Velcro® pieces on the confronting faces of the outsides of the bottom halves attach the two halves together when they are folded into substantial face-to-face contact as the organizer is being collapsed from erected condition. This also collapses the unstiffened sides, which can then be tucked inward to enable them to be fastened together at the midpoints of their upper edges. In this condition, the top is still open to either side of the tucked-in sides, allowing the organizer to be filled with certain materials like books and notebooks. The handles can be drawn together so that the organizer and contents can be easily carried using only one hand.

Conversely, certain contents may be easier to carry by separating the two handles and using both hands to carry them. Likewise, when the organizer is erected and rather full, it can be conveniently carried using two hands, one grasping each handle.

The foregoing, along with additional features, advantages, and benefits of the invention, will be seen in the ensuing description and claims, which should be considered in conjunction with the accompanying drawings. The drawings disclose a presently preferred embodiment of the invention according to the best mode contemplated at this time for carrying out the invention.

DESCRIPTION OF THE PREFERRED EMBODIMENT

Figure 1:
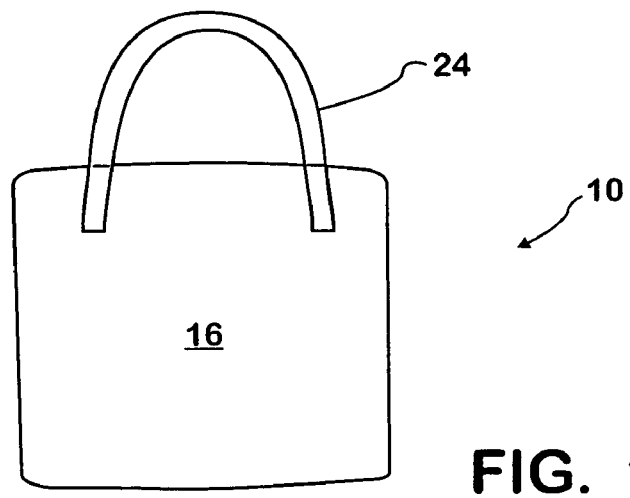
FIG. 1 shows side view of the organizer in a folded-up state.

When fully open and erected as in FIGS. 4, 5, 6, and 8, the fabric organizer 10 has a bottom 12 and four sides 14, 16, 18, 20. The top is open. The sides and bottom are fabric lined on the inside. Sides 16 and 20 comprise rectangular pieces of semi-rigid material, such as cardboard, that provide rigidifying inserts completely enclosed by fabric on the outside and liner fabric on the inside that are stitched together around their edges. Sides 14 and 18 and bottom 12 comprise fabric and liner stitched together along their edges, but without an insert. While not always necessary, it is generally desirable that the fabric comprising the outside of the organizer be durable and of relatively heavy weight in order to contribute to the shape and stability of the open organizer. Fabric handles 22, 24 are attached to the outside of opposite sides 16, 20 as shown. On the outside of bottom 12 are two pieces of Velcro® hook material 26, 28 and two pieces of Velcro loop material 30, 32 arranged in a rectangular pattern as shown.

The bottom 12 is divided into two halves by a fold 34 defined by a row of stitching which continues up sides 14 and 18, also defining folds 36 and 38. When the bottom is folded onto itself as in the conditions of FIGS. 1, 2, 3, and 7. Piece 26 adheres to piece 30 and piece 28 to piece 32. The two halves extend into the space between the sides 16-20.

Figure 2:
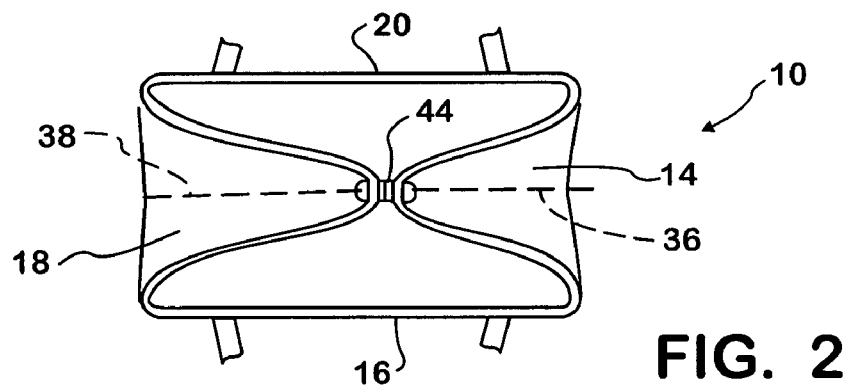
FIG. 2 is a top plan view with the top spread partially open.
Figure 3:
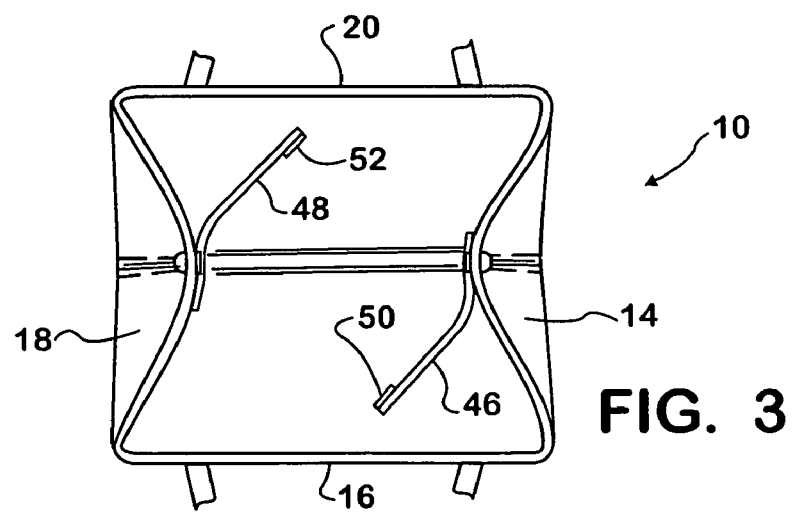
FIG. 3 is a top plan view with the top spread more fully open, but the bottom still folded.
Figure 4:
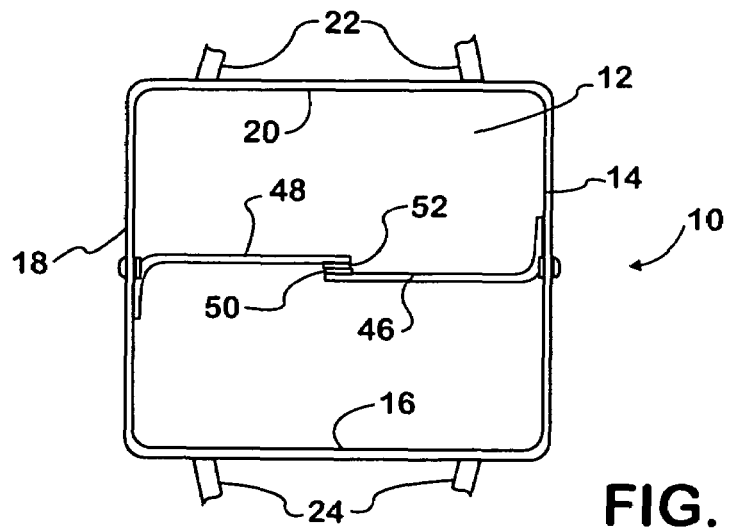
FIG. 4 is a top plan view with the top spread fully open, and the bottom spread flat to give the organizer a generally rectangular shape.
Figure 5:
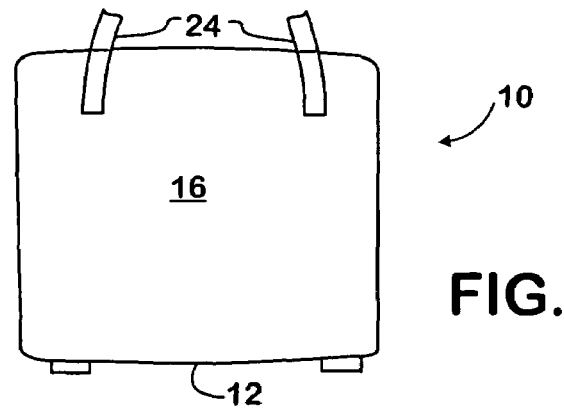
FIG. 5 is front view of FIG. 4.
Figure 6:
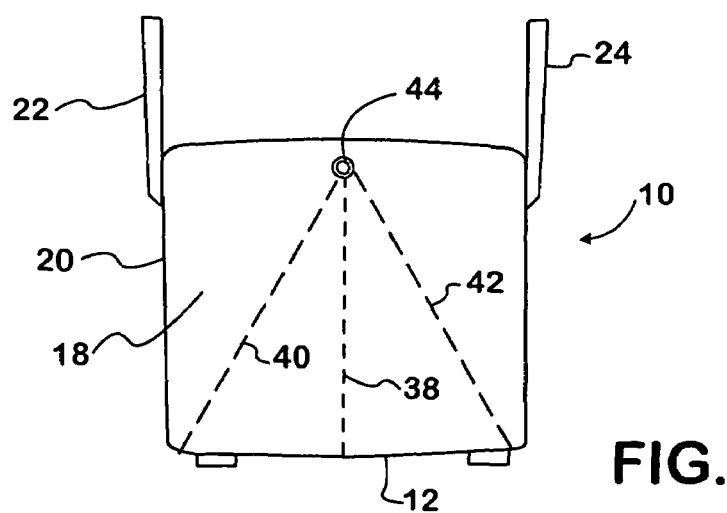
FIG. 6 is a left side view of FIG. 5.

Vertical fold lines 36, 38 divide each side 14, 18 into two halves. Those sides also tend to fold approximately along imaginary lines 40, 42 allowing the organizer to assume conditions like those of FIGS. 1, 2, and 7. Proximate the top of each fold line 36, 38 is an attachment means 44 such as two mating parts of a snap or else opposite Velcro® pieces. FIG. 2 shows the attachment means holding the sides 14, 18 together at the tops of the fold lines 36, 38. For the organizer to assume fully open condition for erection to hold grocery bags, the attachment elements are detached from each other.

Sewn to the inside of sides 14 and 18 just below the attachment means 44 are ends of respective rectangular flaps 46, 48. The flaps have a height about one-fourth to one-third the height of the sides. With the organizer fully open, free ends of flaps 46, 48 are brought together in overlapping relation. Opposite Velcro® pieces 50, 52 fasten the free ends of the flaps together to create two generally equal sized interior compartments, with the flaps forming a divider between the compartments. Each is capable of holding a paper grocery bag containing groceries (not shown). When the grocery bags are removed and the organizer is to be collapsed to the folded FIG. 1 condition, flaps 46, 48 are disconnected and folded back as in FIG. 3. The sides 14 and 18 are brought together at the top and fastened together by attachment means 44, with appropriate folding of the sides as in FIG. 2 concurrent with folding of the bottom. The bottom is pushed up along its fold line 34 to fold its halves onto each other so that the opposite Velcro® pieces on the bottom can re-attach to hold the bottom in folded condition.

The Velcro® pieces on the bottom aid in holding the organizer against sliding on a carpet or fabric, such as in a car trunk, when the organizer is opened and used to contain the grocery bags. It keeps the bags upright and in place. The handles allow the organizer to be carried by hand, even with grocery bags in it. In a modified form, the two halves of the bottom could be provided with respective rigidifying inserts without impairing the ability for the halves to be folded onto each other when the organizer is collapsed.

Figure 7:
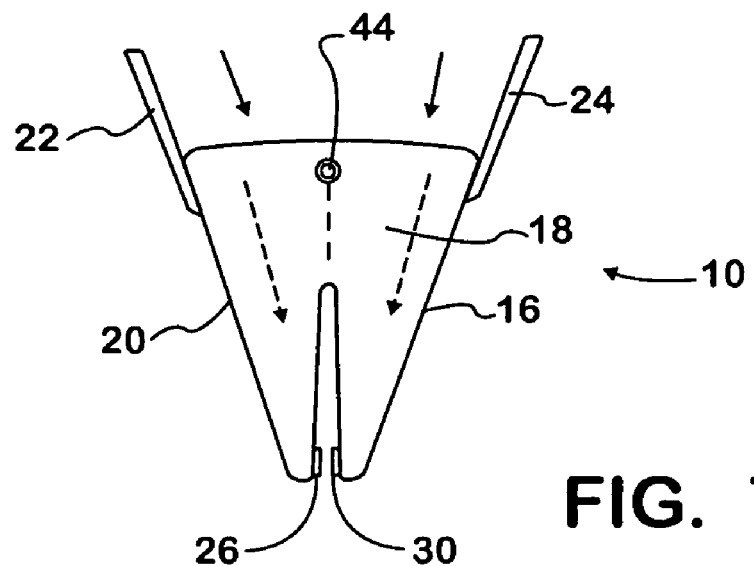
FIG. 7 is left side view corresponding to the FIG. 2.
Figure 8:
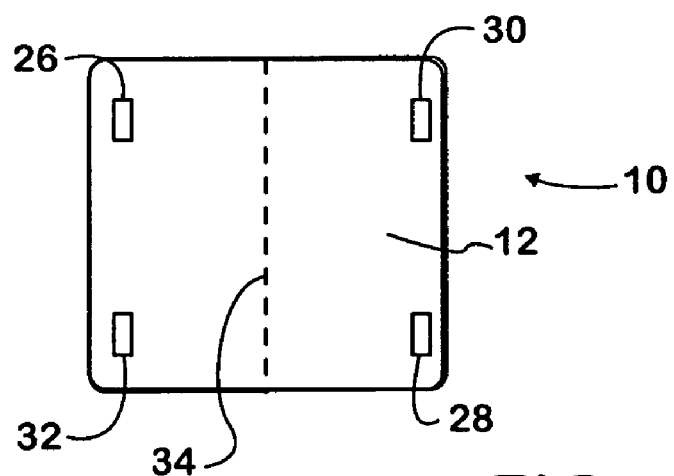
FIG. 8 is a bottom view of FIG. 6.

The organizer can also be used in the condition of FIG. 2 to carry flat sheet-like materials, such as notebooks and the like, or other small objects. The arrows in FIG. 7 show how such materials can be inserted to the organizer while the bottom remains fully folded. Each of the four fastener pieces 26, 28, 30, 32 is disposed proximate a corner of bottom 12 to provide a line about which sides 16 and 20 can pivot when the organizer is collapsed with pieces 26, 28, 30, 32 fastening the two bottom halves, and attachment means 44 is attaching sides 14 and 18 together. Such pivoting tends to enlarge the open area to either side of the attachment means at the top of the organizer.

While a presently preferred embodiment of the invention has been illustrated and described, it should be appreciated that principles of the invention apply to all embodiments falling within the scope of the following claims.

What is claimed is:

1. A collapsible and erectable organizer comprising:
    a rectangular bottom and four rectangular sides joined to edges of the rectangular bottom and to each other along adjoining edges to provide a rectangular opening at the top of the side when the organizer is erected,
    a divider on the interior that extends between one pair of opposite sides to divide the interior into two generally equal size compartments and that can be disconnected when the organizer is to be collapsed to allow. the one pair of sides to be collapsed,
    a fold line extending across the bottom between the one pair of opposite sides dividing the bottom into two equal halves and providing for the two halves to be folded and their exteriors disposed face-to-face when the organizer is collapsed,
    an attachment for attaching the one pair of opposite sides together proximate midpoints of their upper edges when the one pair of opposite sides are collapsed; and
    handles on the other pair of sides for carrying the organizer,
    wherein the other pair of sides are relatively more rigid than the one pair of sides so as to maintain their rectangular shape when the organizer is collapsed, and the other pair of sides comprise respective rigidifying inserts inside respective outer fabric panels and inner fabric liners.

2. A collapsible and erectable organizer as set forth in claim 1 wherein the one pair of sides comprise respective outer fabric panels and inner fabric liners that allow collapse.

* * * * *